(12) United States Patent
MacDonald-Schmidt et al.

(10) Patent No.: US 7,685,857 B2
(45) Date of Patent: Mar. 30, 2010

(54) CURVED EXTRUSIONS AND METHOD OF FORMING THE SAME

(75) Inventors: Tracy MacDonald-Schmidt, Redmond, WA (US); Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/152,580

(22) Filed: May 14, 2008

(65) Prior Publication Data
US 2008/0217808 A1    Sep. 11, 2008

Related U.S. Application Data

(62) Division of application No. 10/931,680, filed on Aug. 31, 2004, now abandoned.

(51) Int. Cl.
*B21C 23/00* (2006.01)
(52) U.S. Cl. .............................. 72/256; 72/254; 72/257; 72/377; 72/379.2
(58) Field of Classification Search ................... 72/254, 72/256, 260, 296, 302, 364, 377, 465.1, 466.8, 72/47, 257, 379.2; 29/527.1, 530
See application file for complete search history.

(56) References Cited

U.S. PATENT DOCUMENTS

| | | | | |
|---|---|---|---|---|
| 2,013,622 | A | * | 9/1935 | Bedford et al. .......... 29/889.72 |
| 2,219,595 | A | * | 10/1940 | Lang .......................... 228/142 |
| 4,970,886 | A | * | 11/1990 | Sikora et al. ................... 72/302 |
| 5,015,117 | A | | 5/1991 | Pawlicki |
| 5,048,247 | A | | 9/1991 | Weldy |

(Continued)

FOREIGN PATENT DOCUMENTS

EP    0644003 A2    3/1995

(Continued)

OTHER PUBLICATIONS

Abbott et al., "Effects of Deposition and Thermal Processing Variables on Laser Additive Manufactured Ti-6Al-4V", 2003, Metals Affordability Initiative, AeroMat 2003, Boeing, pp. 1-25.

(Continued)

*Primary Examiner*—Edward Tolan
(74) *Attorney, Agent, or Firm*—Yee & Associates, P.C.; Brett L. Halperin

(57) ABSTRACT

A curved extrusion includes a body that has indefinite length and a cross-section, and that is formed to contour and at least one channel cut into the cross-section that is filled with deposited material such that said cross-section of said body is restored. By cutting the channels into the cross-section of the extrusion, the extrusion may be easily formed onto a contoured tool to be curved with lower forming and residual stresses and distortion. By filling the channels with deposited material, the original cross-section and strength of the extrusion can be restored. By adding a transverse stiffener, the strength of the original extrusion may not only be restored but also further improved. By depositing material to create structural features the cross-section of the extrusion may be locally changed. The method for forming curved extrusions of the present invention may be used, for example, to produce T-chords of an aircraft.

9 Claims, 4 Drawing Sheets

U.S. PATENT DOCUMENTS

| | | | | |
|---|---|---|---|---|
| 5,048,890 A | * | 9/1991 | Masuda | 296/216.08 |
| 5,666,849 A | * | 9/1997 | Nakazawa et al. | 72/377 |
| 5,735,160 A | * | 4/1998 | VanSumeren et al. | 72/296 |
| 6,101,858 A | * | 8/2000 | Tseng | 72/256 |
| 6,105,902 A | * | 8/2000 | Pettit | 244/119 |
| 6,224,145 B1 | | 5/2001 | Sugiura | |
| 6,767,650 B2 | * | 7/2004 | Hausberger et al. | 428/598 |
| 2002/0078645 A1 | * | 6/2002 | Meyer | 52/289 |
| 2003/0226935 A1 | * | 12/2003 | Garratt et al. | 244/123 |

FOREIGN PATENT DOCUMENTS

| | | | |
|---|---|---|---|
| JP | 57-72728 | * | 5/1982 |
| JP | 57-72729 | * | 5/1982 |
| JP | 58112690 | | 7/1983 |
| JP | 60-76232 | * | 4/1985 |
| JP | 60-255216 | * | 12/1985 |
| WO | 0029142 A1 | | 5/2000 |

OTHER PUBLICATIONS

Swallow, "Producing Parts from Ti-6Al-4V using Hot Roll Forming and Hot Stretch Forming", Boeing Technology Phantom Works, 2004, pp. 1-20.

Slattery et al., "Evaluation of Metal Additive Manufactured Ti-6Al-4V", May 2006, Boeing Technology Phantom Works, AeroMat 2006, pp. 1-15.

* cited by examiner

CURVED EXTRUSIONS AND METHOD OF FORMING THE SAME

This application is a divisional of application Ser. No. 10/931,680, filed Aug. 31, 2004, now abandoned.

BACKGROUND OF THE INVENTION

The present invention generally relates to extrusions and, more particularly, to curved extrusions that are free of residual stress and to a method for forming a curved extrusion with reduced forming and stresses.

The requirements for material used in the aerospace industry are numerous. Demands include improved toughness, lower weight, as well as increased resistance to fatigue and corrosion. The boundaries of material properties are being constantly extended as manufacturers strive to give the next generation of aircraft improved performance while making them more efficient. Titanium and its alloys are increasingly used in the aerospace industry because of their excellent combination of high specific strength (strength-to-weight ratio), which may be maintained at elevated temperature, their fracture resistant characteristics, and their exceptional resistance to corrosion. The titanium alloy currently most commonly used is the alpha-beta alloy Ti6 Al4V. This conventional fine grain titanium alloy commonly used in section sizes up to 200 mm and may be used up to approximately 750° F. Ti6 Al4V is used to manufacture many aerospace airframe and engine components, such as blades, discs, rings, fasteners, cases, vessels, hubs, forgings, and T-chords. Despite the increased usage and production of titanium and its alloys, they are expensive when compared to many other metals and alloys, for example, aluminum and its alloys, because of the complexity of the extraction process, difficulty of melting, and problems during fabrication and machining. Therefore, near net-shape methods, such as extrusions, castings, isothermal forging, and powder metallurgy, have been introduced to reduce the cost of manufacturing titanium components.

The metal working process known as extrusion generally involves pressing metal stock, such as an ingot or billet, through a die opening matching the desired shape in order to form a product having indefinite length and a substantially constant cross section. Extrusion produces compressive and shear forces in the stock. Since no tensile stress is produced, the high deformation is possible without tearing the metal. The term extrusion is usually applied to both the process and the product obtained. A near net-shaped product may be obtained through extrusion, which is especially desirable in costly and difficult to machine alloys, such as alloys of titanium, steel, and nickel. Furthermore, extrusions generally have low tooling costs. However, disadvantages of extrusions include that extrusions have generally a constant cross-section and that extrusions are straight (as shown in FIGS. 1a and 1b). FIG. 1a provides a cross-sectional view of a typical prior art straight extrusion 10 shown in FIG. 1b. Extrusions may be formed to contour as a finishing operation, but the forming process may induce high residual stress in the extrusion and may result in loose tolerances, which are both undesirable. High residual stress of the extrusion may further result in distortion during machining. Furthermore, it might be desirable for some applications to locally change the cross-section of the extrusion.

For instance, one application of a titanium alloy extrusions in the aerospace industry could be for T-chords of an aircraft. T-chords may be used in assembling the wing to the fuselage of an aircraft. T-chords could be manufactured very cost effectively as extrusions since the T-chords are needed at long lengths having a generally constant cross-section, and need to be able to carry heavy loads. However, T-chords have to be curved to follow the shape of an aircraft wing. Since the curving process would induce residual stress within large extrusions, such as the T-chord, distortion of the extrusion may become a problem for assembling the T-chord. Presently, the problem is avoided either by cutting the extrusion in smaller pieces to be assembled to the wing box or by increasing the thickness of the cross-section of the extrusions.

Other prior art methods to produce near net-shape titanium and titanium alloy products include deposition processes, such as Laser Additive Manufacturing™ (LAM) offered by AeroMet Corporation (Eden Prairie, Minn.) and Laser Engineered Net Shaping™ (LENS) developed by Sandia National Labs which is being commercialized by Optomec Design Corporation. Both technologies utilize laser powder forming where typically metal or ceramic powder materials are delivered directly into a melt pool created by a laser beam to form parts in layerwise fashion. The strength of these technologies lies in the ability to fabricate fully dense metal or metal alloy parts with good metallurgical properties at reasonable speeds. While a variety of materials can be used such as stainless steel, Inconel, copper, aluminum etc., reactive materials such as titanium and titanium alloys are of particular interest. LAM is a fabrication method, which can be used to manufacture metallic preforms directly from computer-generated 3 D drawings. In this manner, freestanding shapes may be generated without molds or dies. The advantage of LENS lies in its ability to generate components having overhanging structures that are fully dense. However, these technologies have the disadvantage that the number and size of the components formed is limited and that production of components is costly. Deposition processes, such as LAM and LENS are very much suitable, for example, to rapidly produce replacement titanium components for the aerospace industries rather than to produce components that are constantly needed in high numbers.

As can be seen, there is a need for extrusions that may be formed to contour without inducing residual stress. Furthermore, there is a need to make local changes to the cross-section of an extrusion, for example, for the purpose of adding strength. Also, there is a need to provide large contoured extrusions made out of titanium or titanium alloys that are free of residual stress with more design flexibility at lower costs, and with reduced lead times. Moreover, there is a need to provide a method for forming extrusions into curved shapes without inducing residual stress.

There has, therefore, arisen a need to provide curved extrusions that are free of residual stress. There has further arisen a need to provide large titanium and titanium alloy extrusions that may be formed to contour. There has still further arisen a need to provide a method for forming large extrusions without inducing residual stress. There has still further arisen a need to provide a method for local design changes of the cross-section of extrusions.

SUMMARY OF THE INVENTION

The present invention provides curved extrusions that are free of residual stress, extrusions that have local changes of the cross-section, and a method for forming extrusions to contour without inducing residual stress. The present invention further provides large titanium and titanium alloy extrusions formed to contour that are suitable for, but not limited to, applications in the aerospace industry. The present invention still further provides a method for forming extrusions without inducing residual stress.

In one aspect of the present invention, a curved extrusion comprises a body made out of material and having indefinite length and a cross-section, and at least one channel cut into the cross-section. The body extends longitudinally and is formed to contour. The channel is filled with deposited material such that the cross-section of the body is restored.

In another aspect of the present invention, a curved extrusion comprises a body made out of material and having indefinite length and a cross-section, at least one channel cut into the cross-section, and at least one structural feature deposited onto the body. The body extends longitudinally and is formed to contour. The channel is filled with deposited material such that the cross-section of the body is restored. The structural feature changes the cross-section of the body locally.

In still another aspect of the present invention, a curved extrusion comprises a body made out of material and having indefinite length and a cross-section, a first channel cut into the cross-section, a second channel cut into the cross-section, and a transverse stiffener. The body extends longitudinally and is formed to contour. The first channel is filled with deposited material such that the cross-section of the body is restored. The transverse stiffener is deposited in the second channel such that the cross-section of the body is locally changed. The second channel is filled with deposited material such that the cross-section of the body is restored.

In a further aspect of the present invention, a curved extrusion comprises a titanium alloy body having indefinite length and a cross-section including a horizontal leg and an angled vertical leg, at least one first channel cut into the vertical leg, at least one second channel cut into the vertical leg, at least one transverse stiffener, and at least one structural feature made out of the titanium alloy deposited onto the horizontal leg supporting the vertical leg. The body extends longitudinally and is formed to contour. The first channel is a narrow channel. The first channel is filled with titanium alloy deposited such that the cross-section of the body is restored. The second channel has a profile that is a combination of a straight "V" and a stepped "V". The transverse stiffener is deposited in the second channel such that the cross-section of the body is locally changed. The second channel is filled with titanium alloy deposited such that the cross-section of the body is restored. The structural feature changes the cross-section of the body locally.

In still a further aspect of the present invention, a T-chord of an aircraft comprises a body made out of Ti-6 AL-4V and having indefinite length and a cross-section including a horizontal leg and an vertical leg, at least one first channel cut into the vertical leg, at least one second channel cut into the vertical leg, and a transverse stiffener. The body extends longitudinally and is formed to contour. The first channel is filled with deposited Ti-6 AL-4V such that the cross-section of the body is restored. The transverse stiffener is deposited in the second channel such that the cross-section of the body is locally changed. The second channel is filled with deposited Ti-6 AL-4V such that the cross-section of the body is restored.

In still another aspect of the present invention, a method for forming a curved extrusion comprises the steps of: cutting at least one channel into a straight extrusion having a cross-section; clamping the extrusion to a contoured tool; filling the channel by depositing material; restoring the cross-section; and removing the extrusion from the contoured tool.

These and other features, aspects and advantages of the present invention will become better understood with reference to the following drawings, description and claims.

DETAILED DESCRIPTION OF THE INVENTION

Figure 1A:
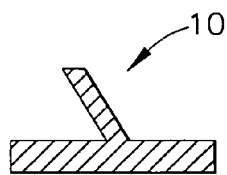
FIG. 1a is a cross-sectional view of a typical prior art straight extrusion.
Figure 1B:
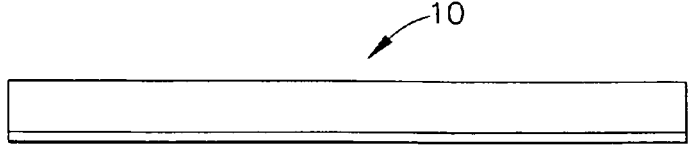
FIG. 1b is a side view of a typical prior art straight extrusion.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, an embodiment of the present invention provides a curved extrusion that is free of residual stress. Contrary to the known prior art, the extrusion as in one embodiment of the present invention includes channels cut into one leg of the extrusion prior to forming the extrusion to contour in order to prevent residual stress. The curved extrusion as in one embodiment of the present invention may be used, for example, in the aerospace industry. By using the method for forming a curved extrusion as in one embodiment of the present invention it will be possible to manufacture large extrusions that are free of residual stress and that may be formed to contour from materials such as titanium and titanium alloys. This is not possible by using prior art methods. Such curved titanium alloy extrusions could be used, for example, to produce T-chords of an aircraft, which would result in lower manufacturing costs and reduced lead times compared to prior art methods.

In one embodiment, the present invention provides an extrusion that includes at least one channel cut into one leg of the extrusion, preferably the vertical leg. The number of channels cut into the extrusion may depend on the length of the extrusion, the contour that will be applied to the extrusion, and the purpose of the extrusion. The profiles of the channels, such as narrow, stepped "V", straight "V", and contoured may depend on the geometry of the extrusion and the deposition method that will be used to refill the channels. The purpose of the channels cut into the extrusion as in one embodiment of the present invention, is to reduce the forming stresses and out-of plane deflections within the extrusion during the forming process. It is often difficult to form typical straight prior art extrusions to contour using prior art methods without using high forming stresses or having unintended out-of plane distortion in the base or upstanding legs.

An embodiment of the present invention further provides a curved extrusion, such as a titanium or titanium alloy extrusion, that includes at least one channel that has been cut into the vertical leg of the extrusion before the forming process and that has been refilled using deposition methods after the forming process. By refilling the cut channels, the original strength and cross-section of the extrusion may be restored and a curved extrusion free of residual stress as in one embodiment of the current invention may be obtained. Contrary to prior art curved extrusions, the curved extrusion as in one embodiment of the present invention may be machined as needed without problems. The forming to contour of a typical straight prior art extrusion may induce high residual stress that may result in distortion during machining of the finished part by, for example, drilling, sawing, grinding, milling, reaming, or tapping. Furthermore, the deposition process may be also used to add transverse stiffeners while refilling the cut channels in order to improve the stability and strength of the curved extrusion as in one embodiment. Contrary to prior art extrusions that generally have a constant cross-section, it may be possible to change the cross-section of the curved extrusion as in one embodiment of the present invention by locally adding structure, such as transverse stiffeners, by depositing material.

An embodiment of the present invention further provides a method for forming extrusions that may have changes in the cross-section without inducing residual stress. By cutting channels into an extrusion, forming the extrusion to a desired contour, refilling the cut channels by depositing material into the channels, and by adding design features, such as transverse stiffeners to the cross-section of the extrusion as in one embodiment of the present invention, a large curved titanium or titanium alloy extrusion may be produced that is free of residual stress and requires none or minimal machining before application in the industry, for example, as a T-chord of an aircraft. It is not possible to manufacture a curved extrusion free of residual stress as in one embodiment of the present invention using prior art methods for forming a generally straight extrusion to contour.

Figure 2:
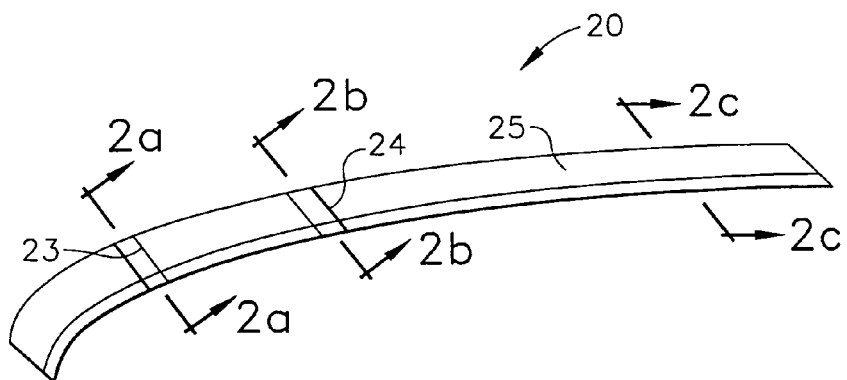
FIG. 2 is a schematic view of a curved extrusion according to one embodiment of the present invention.

Referring now to FIG. 2, a schematic view of a curved extrusion 20 is illustrated according to one embodiment of the present invention. The curved extrusion 20 may include a body 25 made out of extrusion material and having indefinite length and a cross-section 26 (FIG. 2c). Other cross-sections 26, for example, K-shapes, T-shapes are possible. The body 25 may extend longitudinally and may be formed to contour. The curved extrusion 20 may further include a channel 23 and a structural feature 24. The channel 23 may be cut into the extrusion before forming the extrusion to contour. The channel 23 may further be filled with deposited material after forming the extrusion to contour. The channel 23 may be filled such that the original cross-section 26 is restored. The structural feature 24, such as a transverse stiffener may be deposited using prior art metal powder forming or other deposition processes. The structural feature 24 may be deposited such that the cross-section 26 is locally changed. The curved extrusion 20 (as shown in FIG. 2) may have the desired final shape of a part being manufactured. The extrusion 20 may be made out of any material that may be extruded. A desired material for the extrusion 20 may be titanium and titanium alloys, for example the titanium alloy Ti-6 Al-4V, since these materials are increasingly used in the aerospace industry and other industries. Metal powder forming processes, such as LAM, LENS, and others, may be used to fill the channel 23 or to create the structural feature 24 by depositing material similar to the extrusion material. LAM and LENS may be especially suitable for depositing titanium and titanium alloys. The deposition of the material may further be done using other filler/weld techniques.

Referring now to FIG. 2c, a cross-sectional view of the curved extrusion 20 taken along line 2c-2c is illustrated according to one embodiment of the present invention. The cross-section taken along line 2c-2c may be the original cross-section 26 of the extrusion 20 before forming. The extrusion 20 includes a horizontal leg 21 and a vertical leg 22. The vertical leg 22 is shown as angled. The vertical leg 22 may also be straight. The extrusion 20 may further include more than one vertical leg 22 and/or more than one horizontal leg 21.

Figure 2A:
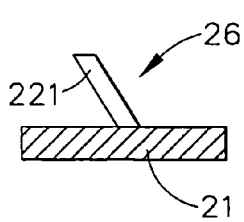
FIG. 2a is a cross-sectional view of a curved extrusion taken along line 2a-2a in accordance with an embodiment of the present invention.

Referring now to FIG. 2a, a cross-sectional view of the curved extrusion 20 taken along line 2a-2a is illustrated according to one embodiment of the present invention. FIG. 2a shows the vertical leg 221 that has been deposited to refill the cut channel 23. As can be seen, the channel 23 may be filled with the deposited vertical leg 221 such that the original cross-section 26 of the extrusion 20, as shown in FIG. 2c, is restored.

Figure 2B:
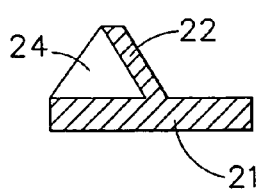
FIG. 2b is a cross-sectional view of a curved extrusion taken along line 2b-2b in accordance with an embodiment of the present invention.
Figure 2C:
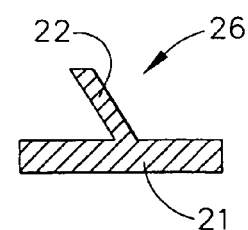
FIG. 2c is a cross-sectional view of a curved extrusion taken along line 2c-2c according to one embodiment of the present invention.

Referring now to FIG. 2b, a cross-sectional view of the curved extrusion 20 taken along line 2b-2b is illustrated according to one embodiment of the present invention. FIG. 2b shows the structural feature 24 as a transverse stiffener deposited to support the vertical leg 22. The structural feature 24 may be deposited onto the horizontal leg 21 supporting the vertical leg 22. By adding the structural feature 24, for example, the strength of the extrusion 20 may be improved. Furthermore, the structural feature 24 may be a added according to the desired final shape of the part being manufactured changing the cross-section 26 (FIG. 2c) locally.

Figure 3:
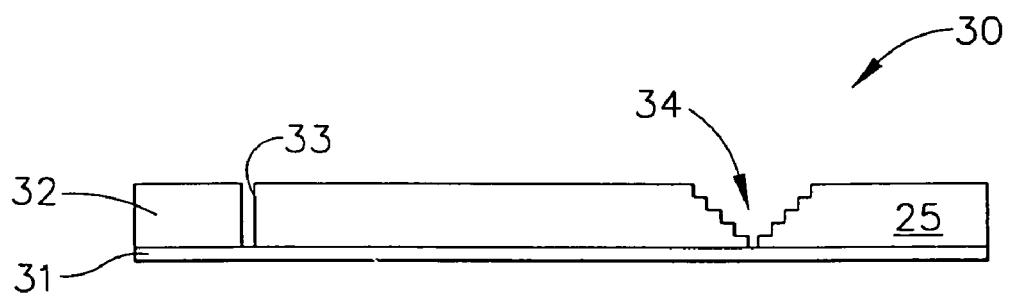
FIG. 3 is a side view of an extrusion according to one embodiment of the present invention.
Figure 4:
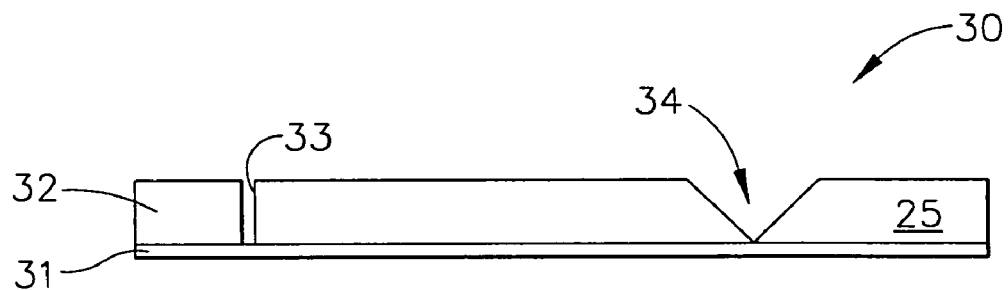
FIG. 4 is a side view of an extrusion according to another embodiment of the present invention.
Figure 5:
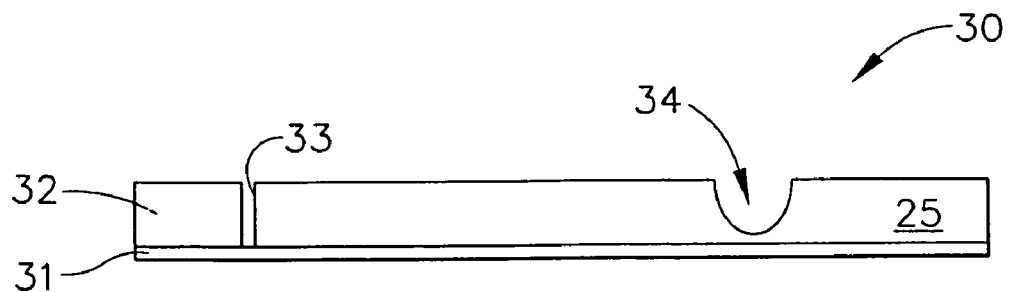
FIG. 5 is a side view of an extrusion according to another embodiment of the present invention.
Figure 6:
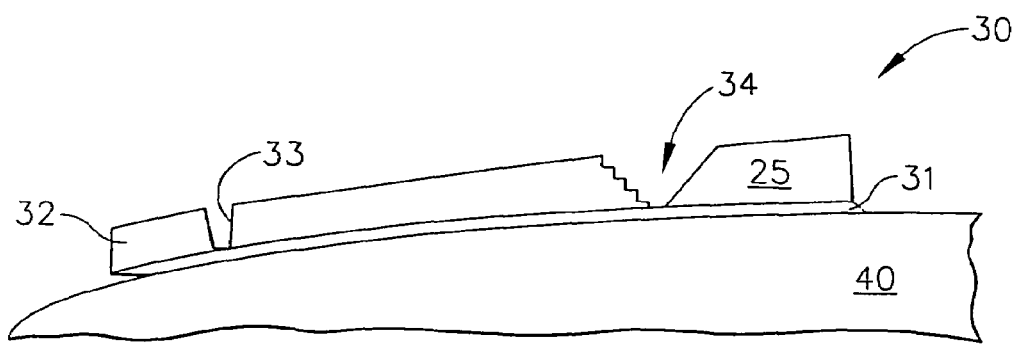
FIG. 6 is a side view of an extrusion mounted onto a contoured tool according to one embodiment of the present invention.
Figure 7:
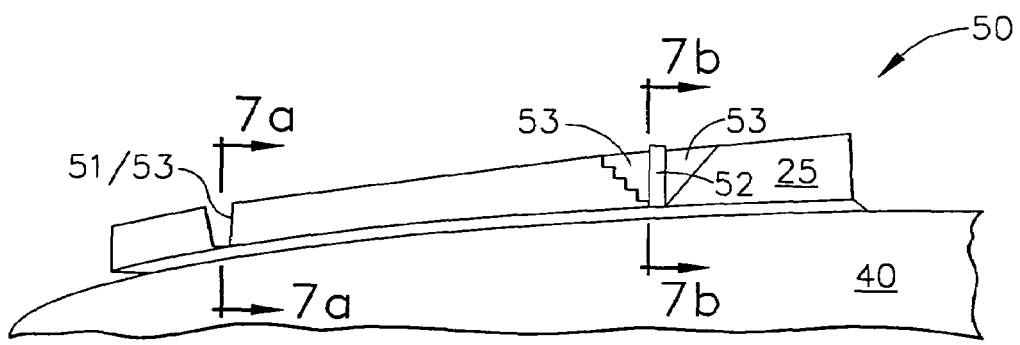
FIG. 7 is a side view of a curved extrusion according to another embodiment of the present invention.

Referring now to FIG. 3, a side view of an extrusion 30 is illustrated according to one embodiment of the present invention. The extrusion 30 may include a horizontal leg 31 and a vertical leg 32. The extrusion 30 may have a body 25 that may have, but is not limited to, the same cross-section 26 as the extrusion 20 shown in FIG. 2c. The extrusion 30 may be a generally straight extrusion having indefinite length and extending longitudinally. The extrusion 30 may be created by pressing metal stock, such as an ingot or billet, through a die opening matching the desired shape (prior art). The extrusion 30 may further include a channel 33 and a channel 34 cut into the vertical leg 32. The channel 33 may have, but is not limited to, a narrow profile (as shown in FIGS. 3, 4, 5, 6, and 7). The channel 34 may have, but is nor limited to, a stepped "V" profile (as shown in FIG. 3), a straight "V" profile (as shown in FIG. 4), a contoured profile (as shown in FIG. 5), or a combination of profiles, such as a combination of a stepped and a straight "V" (as shown in FIGS. 6 and 7). The profile of the channels 33 and 34 may be selected according to the desired final shape of the part being manufactured and by the deposition process to fill the channel 33 and the channel 34. Furthermore, it may be necessary to cut either channel 33 or channel 34 into the extrusion 30 instead of cutting both, and it may further be necessary to cut more than the two channels 33 and 34 depending on the contour the extrusion has to be formed to.

Referring now to FIG. 6, a side view of an extrusion 30 mounted onto a contoured tool 40 is illustrated according to one embodiment of the present invention. The extrusion 30 may include a body 25 that may have, but is not limited to, the same cross-section 26 as the extrusion 20 shown in FIG. 2c. The extrusion 30 may be a generally straight extrusion having indefinite length and extending longitudinally. The extrusion 30 may further include a horizontal leg 31, a vertical leg 32, a first channel 33, and a second channel 34. The extrusion 30 may have the same cross-section as the extrusion 20 shown in FIG. 2c. The channel 33 may have a narrow profile. The channel 34 may have a combination of a stepped and a straight "V" profile. The extrusion 30 may be formed to or clamped to a contoured tool 40. The contoured tool 40 may have the same contour as the part being manufactured (curved extrusion 20 as shown in FIG. 2). The channels 33 and 34 may make the forming of the extrusion 30 to the contoured tool 40 easier. The number and the profile of channels, for example, channel 33 and 34 may be selected such that no residual stress will be induced within the extrusion 30 during forming or clamping to the contoured tool 40. Residual stresses are those stresses which remain in a component, such as the extrusion 30, following manufacture, processing, fabrication or assembly, such as forming or clamping to the contoured tool 40. It is unlikely that any component will be entirely free from residual stresses induced during manufacturing and processing. By stating that no residual stress is induced it is meant that the level of residual stress induced is not significant and, therefore, will not have an effect on further machining and application of the extrusion 30. The forming of the extrusion 30 to the contoured tool 40 may be performed hot or cold and may involve plastic deformation and/or elastic deformation of the extrusion 30. By forming the extrusion 30 to the contoured tool 40, the profile of the channel 33 and the channel 34 may change depending on the contour of tool 40. For example, channel 33 may now have a slight "V" shape and the "V" profile of channel 34 may widen. After forming the extrusion 30 to the contoured tool 40, the extrusion 30 may be stress relieved or annealed at an elevated temperature. For example, the titanium alloy Ti-6Al-4V may be stress relieved or annealed at a temperature between greater than 1550° F. for a time greater than 2 hours.

Figure 7A:
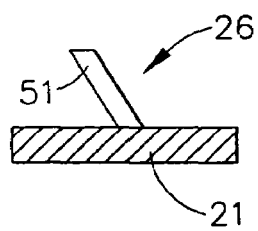
FIG. 7a is a cross-sectional view of a curved extrusion taken along line 7a-7a according to one embodiment of the present invention.
Figure 7B:
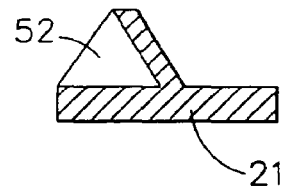
FIG. 7b is a cross-sectional view of a curved extrusion taken along line 7b-7b according to one embodiment of the present invention.

Referring now to FIG. 7, a side view of a curved extrusion 50 is illustrated according to another embodiment of the present invention. The extrusion 50 may have a body 25 that may have, but is not limited to, the same cross-section 26 as the extrusion 20 shown in FIG. 2c. The extrusion 50 may be a generally straight extrusion having indefinite length and extending longitudinally. The curved extrusion 50 may include a horizontal leg 31, a vertical leg 32, a deposited vertical leg 51, and a transverse stiffener 52. The extrusion 50 may have the same cross-section 26 as the extrusion 20 shown in FIG. 2c. The curved extrusion 50 may be mounted to a contoured tool 40. The deposited vertical leg 41 may be created by depositing material in the location of channel 33 (as shown in FIGS. 3, 4, 5, and 6). By creating the deposited leg 51, the original cross-section 26 of the extrusion 50 (as shown in FIG. 2c) may be restored, as can be seen in FIG. 7a. FIG. 7a illustrates the cross-section of the extrusion 50 taken along line 7a-7a. The transverse stiffener 52 may be created by depositing material in the location of channel 34 (as shown in FIGS. 3, 4, 5, and 6). FIG. 7b illustrates the cross-section of the extrusion 50 taken along line 7b-7b showing the transverse stiffener 52 changing the original cross-section 26 (shown in FIG. 2c). Since the transverse stiffener 52 may not fill the channel 34 completely, additional material 53 may need to be deposited in order to refill the channel 34 completely (FIG. 7). The additional material 53 may be deposited such that the cross-section 26 is restored. The deposition of the material to fill the channel 33, channel 34, and to create the transverse stiffener 52 may be done using laser powder forming techniques, such as LAM and LENS. The deposition of the material may further be done using other filler/weld techniques. The deposition method may be selected depending on the cross-section of the extrusion 50 and the size of the cut channels, for example channels 33 and 34 (shown in FIGS. 3, 4, 5, and 6). By adding material 53 back to the cut channels, such as channels 33 and 34, the strength of the original extrusion 30 (shown in FIGS. 3, 4, 5, and 6), may be restored. By adding the transverse stiffener 52, the strength of the original extrusion 30 (shown in FIGS. 3, 4, 5, and 6), may not only be restored but further improved. After the deposition of the material, the extrusion 50 may remain clamped to the contoured tool 40 and undergo standard stress relief, annealing, and aging procedures typical for the extrusion material used. For example, the titanium alloy Ti-6 Al-4V may be thermally treated at a temperature greater than 1550° F. for a time greater than 2 hours. Titanium and titanium alloys, for example, titanium alloy Ti-6 Al-4V, are materials that may be highly suitable to manufacture a curved extrusion 50, as shown in FIG. 7.

Figure 8:
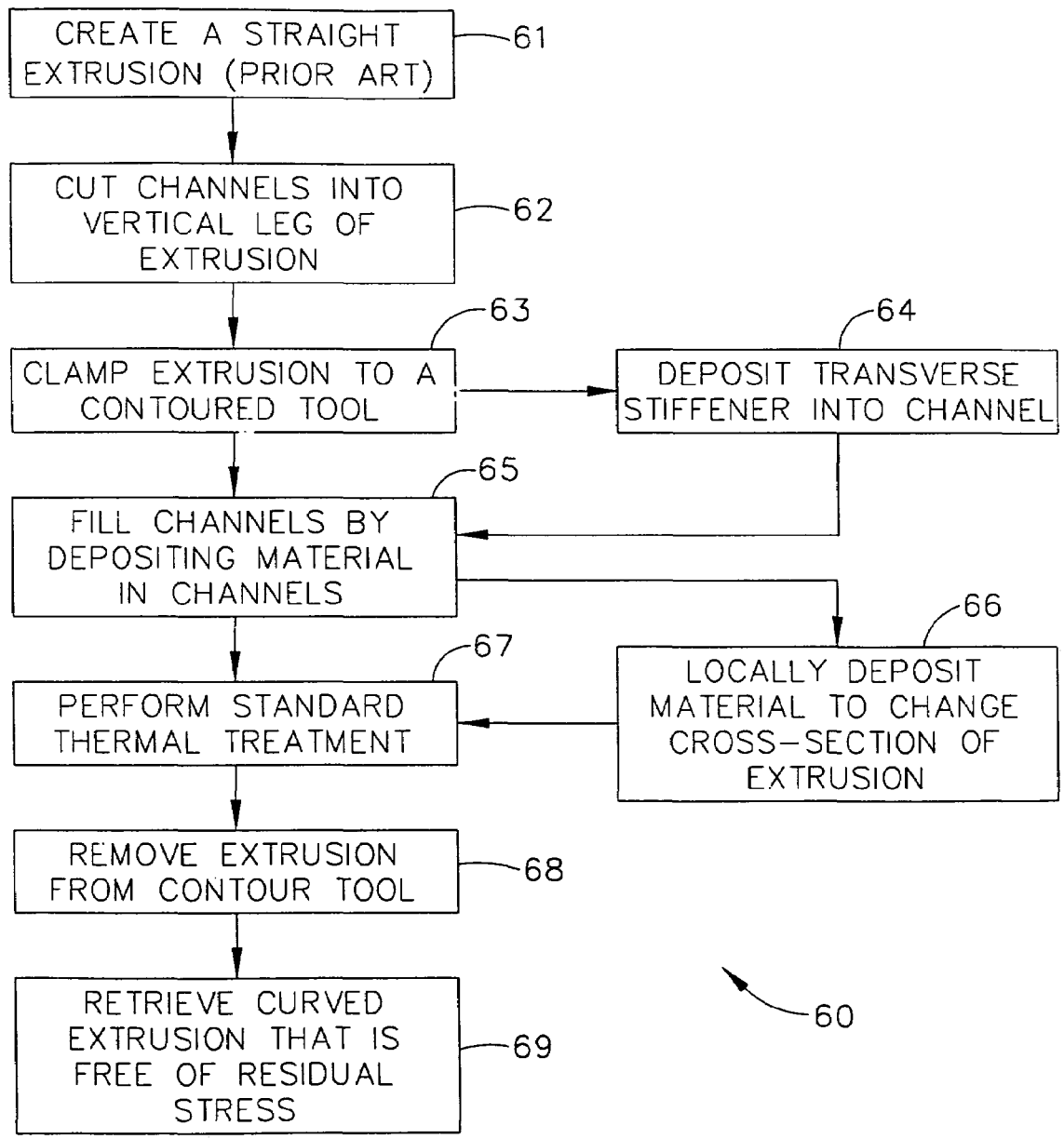
FIG. 8 is a flow chart of a method for forming large extrusions without inducing residual stress according to another embodiment of the present invention.

Referring now to FIG. 8, a flow chart of a method 60 for forming a curved extrusion 20 or 50 without inducing residual stress is illustrated according to another embodiment of the present invention. The method 60 for forming a curved extrusion 20 or 50 may include the steps of: creating a straight extrusion 30 by pressing metal stock, such as an ingot or billet, through a die opening matching the desired shape in order to form a product having indefinite length and a substantially constant cross section (step 61—prior art); cutting channels 33 and 34 into the vertical leg 32 of the extrusion 30 (step 62); clamping the extrusion 30 to a contoured tool 40 (step 63); depositing a transverse stiffener 52 into channel 34 as needed (step 64); filling the channels 33 and 34 by depositing material 53 in the channels 33 and 34 using laser powder forming techniques (step 65); locally depositing material to change the cross-section of the extrusion according to the desired final shape of the part being manufactured (step 66); performing standard thermal treatments, such as stress relief, annealing, and aging procedures, while the extrusion 50 is still clamped to the contoured tool 40 (step 67); removing extrusion 50 from the contoured tool 40 (step 68); and retrieving a curved extrusion 20 or 50 that is free of residual stress (step 69). The curved extrusion 20 or 50 may be free of residual stress, which means the curved extrusion 20 or 50 may have a residual stress level that is not significant regarding further machining or application of the extrusion 20 or 50. The extrusion 30 may be heated before clamping to contoured tool 40. By cutting the channels 33 and 34 into the vertical leg 32 of the extrusion 30, the extrusion 30 may be easily formed onto the contoured tool 40 with reduced forming and residual stresses. By filling the channels 33 and 34 with deposited material 53, the original cross-section 26 and strength of the extrusion 30 may be restored. By adding the transverse stiffener 52, the strength of the original extrusion 30 may not only be restored but further improved. The method 60 for forming a curved extrusion may be used to manufacture large curved extrusion (long length) having local changes in the cross-section. Such parts may be needed, for example, in the aerospace industry. For example, T-chords of aircraft could be manufactured using method 60. Furthermore, the method 60 may be suitable to manufacture titanium and titanium alloy parts as needed in the aerospace industry with low costs and reduced lead times by lowering non-recurring tooling costs and recurring set-up time and costs compared to prior art manufacturing methods. Although the curved extrusions 20 and 50 and the method 60 for forming a curved extrusion 20 or 50 without inducing residual stress have been described for the cross-section illustrated in FIG. 2c and for titanium and titanium alloys, other cross-sections as well as other extrusion materials may be used.

It should be understood, of course, that the foregoing relates to exemplary embodiments of the invention and that modifications may be made without departing from the spirit and scope of the invention as set forth in the following claims.

We claim:

1. A method for forming a curved extrusion, the method comprising:
    cutting at least one channel into an extrusion, the extrusion having a cross-section;
    forming said extrusion around a contoured tool;
    depositing a transverse stiffener into the at least one channel, the deposition method being one of a metal powder forming process and a filler technique;
    restoring said cross-section by filling the at least one channel with a filler material, the filler material having the capability to carry a number of structural loads equivalent to a base material of the extrusion; and
    removing said extrusion from said contoured tool.

2. The method of claim 1, further comprising the step of: retrieving a curved extrusion that is free of residual stress.

3. The method of claim 1, wherein the at least one channel is an at least one first channel having a "V" profile, and further comprising:
    cutting at least one second channel being a narrow channel into said cross-section.

4. The method of claim 3, wherein the metal powder forming process is one of Laser Additive Manufacturing ("LAM") and Laser Engineered Net Shaping ("LENS").

5. The method of claim 1, further comprising the step of:
    depositing material locally onto said extrusion to change said cross-section.

6. The method of claim 1, further comprising the step of:
    performing standard thermal treatments before removing said curved extrusion from said contoured tool.

7. The method of claim 1, further comprising the step of:
    heating said extrusion before clamping to contoured tool.

8. The method of claim 1, wherein the filler material is the base material of the extrusion.

9. The method of claim 1, wherein the extrusion is a straight extrusion.

* * * * *